(12) United States Patent
Hohenadel et al.

(10) Patent No.: US 6,242,541 B1
(45) Date of Patent: Jun. 5, 2001

(54) PVC POLYMERIZATION WITH METERED ADDITION OF EMULSIFIERS

(75) Inventors: Robert Hohenadel, Winhoering; Rudolf Puhe; Eberhard Baer, both of Burghausen; Alfred Lux, Burgkirchen, all of (DE)

(73) Assignee: Vinnolit Kunststoff GmbH, Ismaning (DE)

( * ) Notice: Subject to any disclaimer, the term of this patent is extended or adjusted under 35 U.S.C. 154(b) by 0 days.

(21) Appl. No.: 09/166,986

(22) Filed: Oct. 6, 1998

(30) Foreign Application Priority Data

Oct. 10, 1997 (DE) ............................... 197 44 845

(51) Int. Cl.⁷ ................. C08F 2/24; C08F 2/26; C08F 2/30; C08F 14/06; C08L 27/06

(52) U.S. Cl. .................. 526/81; 526/344; 526/344.2; 526/345; 524/569

(58) Field of Search ................... 526/81, 344.2, 526/344, 345; 524/569

(56) References Cited

U.S. PATENT DOCUMENTS

| | | | | |
|---|---|---|---|---|
| 3,189,587 | * | 6/1965 | Donat | 260/92.8 |
| 3,546,154 | | 12/1970 | Hwa et al. | |
| 4,046,730 | * | 9/1977 | Tortai | 260/29.6 RB |
| 4,071,675 | | 1/1978 | Yu et al. | |
| 4,098,978 | | 7/1978 | Mikofalvy et al. | |
| 4,631,324 | * | 12/1986 | Borke et al. | 526/212 |

FOREIGN PATENT DOCUMENTS

| | | |
|---|---|---|
| 1745485 | 4/1972 | (DE) . |
| 2542283 | 4/1976 | (DE) . |
| 2633833 | 2/1978 | (DE) . |
| 2801575 | 9/1978 | (DE) . |
| 3049008 | 8/1983 | (DE) . |
| 288160 | 10/1983 | (DE) . |
| 3343766 | * 6/1985 | (DE) ............................... C08F/14/06 |
| 0090142 | 2/1986 | (EP) . |

OTHER PUBLICATIONS

Derwent Abstract corresponding to DE 26 33 833 AN 78–08323A Feb. 2, 1978.
Derwent Abstract corresponding to DE 33 43 766A1 AN 85–147165 Jun. 13, 1985.
Derwent Abstract corresponding to DE 30 49 008C2 AN 82–55173E Aug. 25, 1983.

* cited by examiner

*Primary Examiner*—Donald R. Wilson
*Assistant Examiner*—Kelechi C. Egwim
(74) *Attorney, Agent, or Firm*—Burgess, Ryan & Wayne; Milton J. Wayne; William R. Moran

(57) ABSTRACT

A process for preparing homo- and copolymers of vinyl chloride by batch polymerization in aqueous emulsion in the presence of an emulsifier combination comprising at least two emulsifiers selected from the class consisting of anionic and nonionic emulsifiers, metered in during the polymerization, which comprises metering-in in the first phase of the polymerization, at least one emulsifier of the emulsifier combination having at least 10 carbon atoms, and not starting to meter in the remaining emulsifiers of the emulsifier combination until a polymerization conversion of at least 10% has been reached.

7 Claims, No Drawings

PVC POLYMERIZATION WITH METERED ADDITION OF EMULSIFIERS

BACKGROUND OF THE INVENTION

1) Field of the Invention

The invention relates to a process for preparing homo- and copolymers of vinyl chloride by batch polymerization in aqueous emulsion in the presence of an emulsifier combination made from at least two emulsifiers selected from the class consisting of the anionic and nonionic emulsifiers, metered in during the polymerization.

2) Background Art

Pastable homo- and copolymers of vinyl chloride, which are suitable for producing plastisols, are prepared by emulsion polymerization or microsuspension polymerization in the presence of one or more emulsifiers. The type and amount of the surfactants used in emulsion polymerization affects not only the paste viscosity significantly, but also the properties of the final polymer product, for example transparency, antistatic properties, foamability and moisture absorption. In many cases, the properties required in the final product cannot be achieved using just one emulsifier, but only with emulsifier mixtures.

To this end, the initial charge in single-step polymerization processes comprises emulsifier mixtures. In surfactant-feed polymerizations, they are metered in during the polymerization procedure. One or more other emulsifiers may also be added afterward to the completely polymerized latex before spray drying.

A single-step emulsion polymerization process in which the initial charge comprises an emulsifier mixture is described, for example, in DE-A 2801575 (U.S. Pat. No. 4,071,675). A disadvantage here is that single-step emulsion polymerization of vinyl chloride generally gives very small polymer particles. The resultant latices have low latex stability and paste PVC prepared from them is highly viscous.

To improve latex stability and paste viscosity, the prior art recommends that the emulsifiers be metered in, and a wide variety of different versions has been described. It is known from DE-A 3343766 and EP-A 90142 (U.S. Pat. No. 4,631,324) that pastable vinyl chloride polymers can be prepared using an initial charge which comprises part of the emulsifier mixture and metering in the remainder of the mixture during the course of the polymerization. DE-A 2633833 and DE-A 3049008 describe processes in which emulsifier mixtures are metered in during the polymerization as a function of the polymerization conversion or of the surface tension of the polymerization mix. The polymerization of paste PVC in the presence of seed latex and of an emulsifier mixture is described, for example, in DE-A 2542283 (U.S. Pat. No. 4,046,730). The initial charge here comprises the seed latex and one portion of the emulsifier mixture or one component of the emulsifier mixture, and the remainder of the mixture or the other components of the mixture are metered in during the polymerization. The disadvantage of metering in mixed emulsifiers in the manner mentioned is that at least one component of the surfactant mixture is generally used for its influence on final product properties. Its use during the polymerization results in an adverse effect on rheology, i.e. higher paste viscosities generally have to be accepted.

When emulsifiers are metered in afterward into the completely polymerized latex, that is to say additional surfactant is metered in before or during the spray drying, the desired rheological properties of the polymers remain substantially unaffected, but this additional feed results in a very high total surfactant content. However, high surfactant concentrations in the polymer cause undesirable side effects, such as greater moisture absorption (unacceptable in particular for outdoor applications), color changes, viscosity variations, impairment of transparency and exudation phenomena linked with surface gloss, odor, fogging and tack.

DE-A 1745485 (U.S. Pat. No. 3,546,154) describes a process for emulsion polymerization of vinyl chloride in which, in order to obtain polymer dispersions with very large primary particles, the surfactants added at the start of or during the polymerization are exclusively poorly emulsifying, short-chain surfactants with a chain length from 5 to 9 carbon atoms, and the addition of long-chain surfactants with good emulsifying action does not take place until a second phase of polymerization or after the polymerization has been completed. A disadvantage is that the poorly emulsifying short-chain surfactants ensure no more than a weak stabilization of the polymerizing latex, and therefore coagulation can easily occur if there is strong agitation, and on the other hand if the agitation is weaker separation of the phases is likely. In addition, if the polymerization is carried out to relatively high conversions with exclusively poorly emulsifying surfactants, relatively large amounts of emulsifier have to be added, and these are still further increased when the latex has been stabilized with a strong surfactant.

It was therefore an object of the invention to develop a process which serves for the preparation of homo- and copolymers of vinyl chloride by batch polymerization in aqueous emulsion and which, even if the emulsifier combinations used comprise surfactants used to achieve desirable properties in the final product, minimizes the paste viscosity obtainable with the polymerization product and at the same time gives a low total surfactant concentration.

SUMMARY OF THE INVENTION

Surprisingly, this has been possible using sequential feed of surfactants of the emulsifer combination, by metering in the constituents of the emulsifier combination one after the other.

The invention provides a process for preparing homo- and copolymers of vinyl chloride by batch polymerization in aqueous emulsion in the presence of an emulsifier combination made from at least two emulsifiers selected from the class consisting of the anionic and nonionic emulsifiers, metered in during the polymerization, which comprises metering in in the first phase of the polymerization at least one emulsifier of the emulsifier combination having at least 10 carbon atoms, and not starting to meter in the remaining emulsifiers of the emulsifier combination until a polymerization conversion of at least 10% has been reached.

DESCRIPTION OF THE PREFERRED EMBODIMENTS

The monomers used in the polymerization are vinyl chloride or mixtures of vinyl chloride with ethylenically unsaturated monomers copolymerizable therewith. Examples of suitable comonomers are vinyl esters of saturated carboxylic acids having from 2 to 12 carbon atoms, such as vinyl acetate, vinyl propionate, vinyl laurate and vinyl versatates, such as VeoVa®9 and VeoVa®10 (Trademark of Shell co. For vinyl esters of highly branched C-9 and C-10 isomers of saturated monocarboxyler acid mixtures); (meth)acrylates of alcohols having from 1 to 12 carbon atoms, such as methyl acrylate, methyl methacrylate, ethyl acrylate, n-butyl acrylate, n-butyl methacrylate, tert-butyl acrylate and 2-ethylhexyl acrylate; ethylenically unsaturated mono- and dicarboxylic acids, such as acrylic acid, methacrylic acid, maleic acid and fumaric acid; mono- and diesters of ethylenically unsaturated dicarboxylic acids, such as diisopropyl fumarate; vinyl aromatic compounds, such as styrene and vinyltoluene; olefins, such as ethylene and propylene. If use is made of mixtures of vinyl chloride with one or more of the comonomers mentioned, the proportion of the comonomers, based on the total weight of the monomer mixture, is preferably up to 30% by weight.

The initial charge for the polymerization may also comprise seed latices based on vinyl chloride homopolymers or on vinyl chloride copolymers with the comonomers mentioned.

Possible emulsifiers are the anionic and non-ionic surfactants known to be appropriate for emulsion polymerization of vinyl chloride and containing at least 10 carbon atoms. Anionic surfactants are preferably used. Examples of suitable anionic emulsifiers having at least 10 carbon atoms are alkyl sulfates with a chain length of from 10 to 18 carbon atoms, alkyl and alkylaryl ether sulfates having from 10 to 24 carbon atoms in the hydrophobic radical and up to 40 ethylene oxide or propylene oxide units, alkyl- and alkylarylsulfonates having from 10 to 24 carbon atoms, alkyldiphenyl oxide disulfonates, oleic acid sulfonates, esters and monoesters of sulfosuccinic acid with monohydric alcohols or with alkylphenols, and alkyl- and alkenylcarboxylates with a chain length of from 10 to 18 carbon atoms. Examples of suitable non-ionic surfactants having at least 10 carbon atoms are alkyl polyglycol ethers and alkylaryl polyglycol ethers, in each case with from 4 to 40 ethylene oxide units, alkyl and alkenyl alcohols having from 12 to 20 carbon atoms, ethoxylated alkyl and alkenyl alcohols having from 12 to 20 carbon atoms and ethoxylated alkylphenols.

The selection of the surfactants for the emulsifier combination depends on the desired paste viscosity and the properties desired in the final vinyl chloride polymer product. The relationship between surfactant selection and paste viscosity and final product properties is known to the person skilled in the art:

For example, the alkyl sulfates mentioned generally give small primary particles and therefore highly viscous plastisols, and the chemical foamability of the final products is very good. Examples of suitable alkyl sulfates are the alkali metal (Na and K) and ammonium lauryl sulfates and the corresponding myristyl, palmityl and stearyl sulfates.

The alkylcarboxylates, used in the form of ammonium salts for example, give low-viscosity plastisols, and the final products have low moisture absorption. Examples of alkyl carboxylates are the alkali metal (Na and K) and ammonium laurates, myristates, palmitates and stearates.

The long-chain sulfosuccinates bring about the growth of large primary particles and give low-viscosity plastisols. Examples of those commonly used are the alkali metal (Na and K) and ammonium salts of sulfosuccinic esters whose alcohol moieties contain from 6 to 14 carbon atoms, such as Na dihexyl sulfosuccinate, Na dioctylsulfosuccinate, Na di-2-ethylhexylsulfosuccinate, Na dicyclohexylsulfosuccinate, Na didecylsulfosuccinate and Na ditridecylsulfosuccinate.

Alkylbenzenesulfonates give polymers with very good transparency. Examples of these are the alkali metal (Na and K) and ammonium octylbenzenesulfonates and the corresponding decylbenzenesulfonates, dodecylbenzenesulfonates and tetrapropylenebenzene-sulfonates.

Alkylsulfonates give final products with very good antistatic properties. Examples of these are the alkali metal (Na and K) and ammonium decylsulfonates and the corresponding dodecylsulfonates, myristyl-sulfonates, palmitylsulfonates and stearylsulfonates and mixtures of alkylsulfonates, such as Mersolat K 30 (Bayer trade name, n-alkanesulfontes with chain length from 13 to 17 carbon atoms).

In a preferred embodiment, the emulsifiers metered in in the first phase of the polymerization are one or more emulsifiers of the emulsifier combination which give products with low paste viscosity. The first phase of the polymerization here is the period of time between initiating the polymerization and completing the metering in of the emulsifiers of the emulsifier combination which are the first to be metered in. It is particularly preferable for the emulsifiers metered in in the first phase to be one or more emulsifiers selected from the class encompassing alkylarylsulfonates having from 10 to 24 carbon atoms, sulfosuccinates of monohydric alcohols having at least 10 carbon atoms and alkylcarboxylates with a chain length of from 10 to 18 carbon atoms. The greatest preference is given to the embodiment in which the emulsifiers metered in in the first phase are one or more emulsifiers selected from the class consisting of the alkylarylsulfonates having from 10 to 24 carbon atoms.

The emulsifiers to be metered in afterward preferably include surfactants used to adjust certain properties of the final product. Typical examples of suitable emulsifiers are alkyl sulfates and alkylsulfonates with a chain length of from 10 to 18 carbon atoms. In cases where the sequence of surfactant feed cannot be predicted from the abovementioned relationships listed as examples, a test polymerization can be carried out to allow correct selection of the surfactant or surfactant mixture to be metered in first.

The total amount of emulsifiers used is usually from 0.5 to 2% by weight, based on the total weight of the monomers. The way in which the amount used is divided between the first and second phases of the polymerization depends on the rheological properties or properties of the final product desired in an individual case, and has to be determined for the individual case. The second phase of the polymerization here is the period of time from the beginning of metering in of the remaining emulsifiers of the emulsifier combination to the end of the polymerization.

The duration of surfactant feed in the first phase of the polymerization depends mainly on the emulsifier combination desired in the final product and on the amount of emulsifier desired in the final product. It is preferable for the emulsifier feed in the first phase to take place until the polymerization conversion is not more than 40%, particularly preferably until the polymerization conversion is not more than 20%. It is preferable for the metering-in of the remaining emulsifiers of the emulsifier combination not to start until the metering-in of the emulsifiers of the first phase has been completed, that is to say metering is sequential.

Both in the first stage and in the second stage, the metering-in of the emulsifier components may be continuous or in portions, preferably continuous. The emulsifiers are preferably added in the form of their aqueous solutions, and if more than one emulsifier is metered in, the aqueous solutions may be metered in separately or as a mixture.

To initiate the polymerization, use is made of the water-soluble initiators usual for emulsion polymerization, in amounts preferably of from 0.01 to 0.5% by weight, based on the total weight of the monomers. Examples of suitable initiators are ammonium peroxodisulfate, potassium peroxodisulfate, hydrogen peroxide, alkyl hydroperoxide, such as tert-butyl hydroperoxide, ammonium peroxodiphosphate and potassium peroxodiphosphate. Initiation can either be direct, by increasing temperature, or at low temperatures using reducing agents, if desired combined with heavy metal salts which catalyze decomposition, for example copper sulfate. Examples of suitable reducing agents are sodium formaldehyde-sulfoxylate, sodium sulfite, sodium hydrogensulfite, dithionite and ascorbic acid, which are preferably used in amounts of from 0.01 to 0.5% by weight, based on the total weight of the monomers.

The emulsion polymerization is carried out in the pressure reactors usual for vinyl chloride polymerization, usually at a temperature of from 30 to 90° C. The initial charge usually comprises some of the vinyl chloride, the remainder being metered in during the course of the polymerization. When vinyl chloride is being copolymerized with other comonomers, the initial charge may comprise these, or part or all of these may be metered in. The initiator is generally metered in. It is preferable for the metering-in of the emulsifiers to begin with the beginning of the initiator feed.

The pH range desirable for the polymerization can be set in a known manner using acids, bases and conventional buffer salts, such as alkali metal phosphates and alkali metal carbonates. To adjust molecular weight, use may be made during the polymerization of the regulators conventionally used, such as mercaptans, aldehydes and chlorohydrocarbons.

The polymers obtainable from the novel procedure are particularly suitable for processing as plastisol (paste PVC). For this, the latex is dried in a known manner, for example by spray drying in the usual spray drying equipment. The plastisols are produced by known processes, generally by mixing 100 parts by weight of polymer with from 40 to 150 parts by weight of plasticizer. Suitable plasticizers are any monomeric or polymeric compounds usually used as a plasticizer for polyvinyl chloride and copolymers thereof. Conventional additives, such as stabilizers, dyes, pigments and fillers, may be added to the plastisols, if desired. The resultant plastisols are suitable for producing coatings, for example by spread-coating, spraying or dipping, and also for the production of cast moldings and of foams.

Particularly in the preparation of paste PVC, the novel procedure gives vinyl chloride polymers which minimize the paste viscosity of PVC plastisols, with at the same time low total surfactant concentration of the emulsifiers, which are selected taking into account the properties desired in the final product.

The examples below serve to describe the invention in greater detail:

EXAMPLE 1

The initial charge comprised 500 kg of demineralized water, 192 g of sodium hydrogencarbonate and 245 kg of vinyl chloride, in an autoclave of 1500 l capacity which was equipped with a stirrer and provided with heating and cooling equipment, and from which atmospheric oxygen was excluded. To initiate the redox-catalyzed decomposition of peroxide, the initial charge also included 0.8 g of $CuSO_4.5H_2O$, and also 160 g of sodium sulfite. The reaction mixture was heated to 57° C. The reaction was initiated by metering in a 0.375% strength aqueous solution of potassium peroxodisulfate (PPS). The PPS feed was adjusted in such a way as to result in a temperature difference of 8° C. between reactor contents and cooling jacket. With the start of the PPS feed, a further 235 kg of vinyl chloride were metered in linearly over a period of 6 hours. Also with the start of the PPS feed, the surfactant feed was run in as follows:

From a polymerization time of 0 to 2 hours, a total of 12 l of a 10% strength aqueous solution of ammonium laurate was metered in continuously. The polymerization conversion after 2 hours was about 20%.

Following this, up to a polymerization time of 8 hours, 36 l of a 10% strength aqueous solution of sodium alkanesulfonate (Mersolat K30 from Bayer AG) were metered in continuously.

After the polymerization had ended (fall in pressure), 480 g of sodium carbonate were added to the reaction mixture, followed by degassing.

The polymer was characterized by determining its Fikentscher K value (DIN 53726). The solids content, the pH and the surface tension of the dispersion were also determined. The dispersion was worked up in a spray-drying plant using two-fluid technology (air/latex) with an entry temperature of 160° C. and a discharge temperature of 65° C. The surfactant content in the PVC powder was then determined.

To determine the paste viscosity, 100 parts by weight of the resultant PVC powder and 60 parts by weight of di-2-ethylhexyl phthalate (DOP) were used to produce a paste in accordance with DIN 54800, and its viscosity was measured at a shear rate of 16 $s^{-1}$ after standing for 1 hour at 23° C.

EXAMPLE 2

The procedure was as in Example 1, but the arrangements for surfactant feed were as follows:

Polymerization time from 0 to 4 hours: metering-in of 24 l of a 10% strength aqueous solution of ammonium laurate. The polymerization conversion after 4 hours was about 40%. Polymerization time from 4 to 8 hours: metering-in of 24 l of a 10% strength aqueous solution of sodium alkanesulfonate (Mersolat K3Q from Bayer AG).

EXAMPLE 3

The procedure was as in Example 1, but the arrangements for surfactant feed were as follows:

Polymerization time from 0 to 2 hours: metering-in of 12 l of a 10% strength aqueous solution of potassium laurate. The polymerization conversion after 2 hours was about 20%.

Polymerization time from 2 to 8 hours: metering-in of 36 l of a 10% strength aqueous solution of sodium alkanesulfonate (Mersolat K30 from Bayer AG).

EXAMPLE 4

The procedure was as in Example 1. The polymerization was carried out with an initial charge of 10.7 kg of a monomodal PVC seed latex (200 nm primary particle size, 45% solids content). The arrangements for surfactant feed were as follows:

Polymerization time from 0 to 4 hours: metering-in of 19.2 l of a 10% strength aqueous solution of sodium dodecylbenzenesulfonate (Melon 50 from Henkel KGaA). The polymerization conversion after 4 hours was about 40%.

Polymerization time from 4 to 8 hours: metering-in of 19.2 l of a 10% strength aqueous solution of sodium lauryl sulfate (Texapon K12 from Henkel KGaA).

Comparative Example A

The procedure was as in Example 1, except that surfactants were not metered in sequentially, but as a mixture: Polymerization time from 0 to 8 hours: surfactant mixture of 12 l of a 10% strength aqueous solution of ammonium laurate and 36 l of a 10% strength aqueous solution of sodium alkanesulfonate.

Comparative Example B

The procedure was as in Example 2, except that surfactants were not metered in sequentially, but as a mixture:

Polymerization time from 0 to 8 hours: surfactant mixture of 24 l of a 10% strength aqueous solution of ammonium laurate and 24 l of a 10% strength aqueous solution of sodium alkanesulfonate.

Comparative Example C

The procedure was as in Example 3, except that the surfactants were not metered in sequentially, but as a mixture: Polymerization time from 0 to 8 hours: surfactant mixture of 12 l of a 10% strength aqueous solution of potassium laurate and 36 l of a 10% strength aqueous solution of sodium alkanesulfonate.

Comparative Example D

The procedure was as in Example 4, except that the surfactants were not metered in sequentially, but as a mixture: Polymerization time from 0 to 8 hours: surfactant mixture of 19.2 l of a 10% strength aqueous solution of sodium dodecylbenzenesulfonate and 19.2 l of a 10% strength aqueous solution of sodium lauryl sulfate.

The results of the measurements for Examples 1 to 4 and Comparative Examples A to D are given in Table 1.

Comparison of measurements from the examples and the corresponding comparative examples shows that the novel procedure gives markedly reduced paste viscosity during processing as plastisol, while surfactant content is the same and the properties of the final PVC product are comparable.

TABLE 1

| Example | Latex data | | | Powder data | | Plastisol data |
| --- | --- | --- | --- | --- | --- | --- |
| | Solids content (%) | Surface tension (mN/m) | pH | K value | Surfactant content (%) | Paste viscosity (Pa · s) |
| Example 1 | 43.1 | 38.3 | 9.8 | 68.2 | 1.0 | 6.4 |
| Comp. Ex. A | 43.6 | 52.6 | 9.6 | 67.7 | 1.0 | 8.7 |
| Example 2 | 41.9 | 37.5 | 9.9 | 68.2 | 1.0 | 6.6 |
| Comp. Ex. B | 43.1 | 51.8 | 9.7 | 67.4 | 1.0 | 7.4 |
| Example 3 | 43.6 | 45.5 | 9.8 | 67.5 | 1.0 | 10.0 |
| Comp. Ex. C | 42.9 | 49.7 | 9.5 | 68.3 | 1.0 | 11.9 |
| Example 4 | 45.0 | 50.7 | 9.7 | 67.5 | 0.8 | 8.6 |
| Comp. Ex. D | 44.2 | 53.3 | 9.6 | 67.7 | 0.8 | 12.2 |

We claim:

1. A process for preparing homo- and copolymers of vinyl chloride by batch polymerization in aqueous emulsion in the presence of an emulsifier combination consisting of at least two emulsifiers selected from the group consisting of anionic and nonionic emulsifiers, wherein the emulsifier combination is metered in during the polymerization, which comprises metering in the first phase of the polymerization, at least one emulsifier of the emulsifier combination having at least 10 carbon atoms and selected from the group consisting of alkylarylsulfonates having from 10 to 24 carbon atoms, sulfosuccinates of monohydric alcohols having at least 10 carbon atoms and alkylcarboxylates with a chain length of from 10 to 18 carbon atoms, and not starting to meter in the remaining emulsifiers of the emulsifier combination until a polymerization conversion of at least 10% has been reached.

2. A process as claimed in claim 1, wherein the emulsifiers metered in the first phase of the polymerization are one or more emulsifiers selected from the group consisting of the alkylarylsulfonates having from 10 to 24 carbon atoms.

3. A process as claimed in claim 1, wherein the emulsifiers metered in the first phase of the polymerization are one or more emulsifiers selected from the group consisting of esters of sulfosuccinic acid with monohydric alcohols and alkylphenols.

4. A process as claimed in claim 1, wherein the metering-in of the emulsifiers in the first phase takes place until the polymerization conversion is not more than 40%.

5. A process as claimed in claim 1, wherein the metering-in of the emulsifiers in the first phase takes place until the polymerization conversion is not more than 20%.

6. A process as claimed in claim 1, wherein the metering-in of the remaining emulsifiers of the emulsifier combination starts only after the metering-in of the emulsifiers in the first phase has been completed.

7. Plasticols prepared from the vinyl chloride homo- and copolymers prepared by the process of claim 1.

\* \* \* \* \*